United States Patent [19]
Kawabata et al.

[11] Patent Number: 5,418,272
[45] Date of Patent: May 23, 1995

[54] ABRASION-RESISTANT FLAME-RETARDANT COMPOSITION

[75] Inventors: Hideo Kawabata; Satoru Kaneko, both of Yokohama, Japan

[73] Assignee: Nippon Petrochemicals Company, Limited, Tokyo, Japan

[21] Appl. No.: 984,999

[22] Filed: Dec. 2, 1992

[30] Foreign Application Priority Data

Dec. 10, 1991 [JP] Japan .................. 3-349830
Dec. 10, 1991 [JP] Japan .................. 3-349831
Dec. 10, 1991 [JP] Japan .................. 3-349832
Dec. 13, 1991 [JP] Japan .................. 3-351219

[51] Int. Cl.⁶ ........................... C08K 3/22; C08K 3/32
[52] U.S. Cl. ................................. 524/436; 524/433; 524/430; 524/414; 428/461; 428/500
[58] Field of Search ............. 524/80, 414, 430, 433, 524/436; 428/461, 500

[56] References Cited

U.S. PATENT DOCUMENTS

| | | | |
|---|---|---|---|
| Re. 30,497 | 1/1981 | Raley, Jr. ................. | 524/414 |
| 5,159,016 | 10/1992 | Inoue et al. ............... | 525/92 |
| 5,216,063 | 6/1993 | Williams .................... | 524/414 |

Primary Examiner—Kriellion S. Morgan
Attorney, Agent, or Firm—Dilworth & Barrese

[57] ABSTRACT

Provided is an abrasion-resistant composition comprising:

(I) 100 parts by weight of a polymer component containing:
  (A) 50–90% by weight, based on the total polymer weight, of a polyolefinic resin having a maximum peak temperature (Tm) of higher than 125° C. as measured by differential scanning calorimetry (DSC); and
  (B) 10–50% by weight, based on the total polymer weight, of a polyethylenic resin or rubber having a maximum peak temperature (Tm) of lower than 125° C. as measured by DSC; and (II) 30–200 parts by weight of an inorganic flame retardant, said polymer component (I) containing $10^{-8}$–$10^{-3}$ gram equivalent based on 1 g of the polymers, of at least one functional group selected from:

a: carboxyl group, an ester group thereof, or an anhydride group thereof,
b: epoxy group,
c: hydroxyl group,
d: amino group,
e: alkenyl cyclic imino ether group, and
f: silane group.

14 Claims, No Drawings

ABRASION-RESISTANT FLAME-RETARDANT COMPOSITION

BACKGROUND OF THE INVENTION

The present invention relates to a flame-retardant composition superior in abrasion resistance and further relates to a coating material or insulating material using the said flame-retardant composition. More particularly, the present invention is concerned with an abrasion-resistant flame-retardant composition which does not evolve a poisonous gas such as halogen gas during combustion and which has an anti-dripping property based on the formation of char, retains flexibility, mechanical characteristics and resistance to chemicals and is superior in heat resistance. The present invention is further concerned with a coating material or insulating material using the said flame-retardant composition for coating or insulating electric wires and cables, for coating electric wire or cable protecting pipes or Joint covers, or for coating or insulating electric components and devices such as cabinet, box and sheet.

Polyolefin resins, because of their superior physical and chemical properties, are general-purpose resins which are in the greatest demand and which are applied to many domestic and industrial uses after being formed into films, sheets, pipes, containers, electric wires, cables, etc. by various molding methods, including extrusion and injection molding.

Since such polyolefin resins are easily flammable, various methods for making them flame-retardant have heretofore been proposed.

Of those methods, one which is adopted most commonly involves the addition of an organic flame retardant such as a halogen or phosphorus-based organic flame retardant to the polyolefin resins.

Although even a small amount of such organic flame retardant is effective, there is a drawback that a harmful gas is evolved during combustion.

Recently, in view of the above point, various methods have been studied (see Japanese Patent Laid Open Nos JP 2-53845A and 2-145632A in which hydrates of inorganometallic compounds such as aluminum hydroxide and magnesium hydroxide are used as low smoking, pollution-free type flame retardants not evolving a harmful gas during combustion.

In a flame-retardant composition using an inorganic flame retardant, it is necessary to use the inorganic flame retardant in a high ratio in order to enhance the flame retardancy of the composition. However, increasing its content makes a practical use of the composition difficult because of deterioration in mechanical strength, flexibility and processability of the composition. To remedy this drawback there also has been proposed a technique of incorporating a high concentration of a soft polyolefin resin in the composition to increase the amount of such inorganic flame retardant accepted (see U.S. Pat. Nos. 2,722,959 and 4,845,146).

However, in the case where a flame-retardant composition containing a large amount of such soft resin is used in the production of such electrically insulated materials as electric wire and cable, such electric materials as protective pipe and joint cover, such interior materials as sheet and floor material, or such molded articles as cabinet and box, the products are susceptible to external flaws caused by friction under severe conditions involving extremely high temperatures, severe vibrations during production, transport and use. Therefore, the improvement of abrasion resistance has been desired.

And to this end, there have been proposed a method of improving the abrasion resistance by crosslinking in the presence of a crosslinking aid (Japanese Patent Laid Open Nos. JP 62-252442A and 62-275139A), a method of using an ethylene/α-olefin copolymer modified with an unsaturated carboxylic acid or a derivative thereof (Japanese Patent Laid Open No. JP 2-101499A), and a method of using as a base polymer a mixture of a polyolefin resin with an ethylene resin containing carboxyl group or carboxylate in the molecule and a thermoplastic elastomer with maleic acid or maleic anhydride added in the molecule (Japanese Patent Laid Open No. JP 2-53845A). In all of these methods, however, there still remains room for improvement in point of processability and abrasion resistance, and a further improvement is desired.

It is the object of the present invention to provide an abrasion-resistant flame-retardant composition which has an improved heat resistance while retaining mechanical strength, flexibility, processability and flame retardancy and which can be used effectively in the production of molded articles, etc., including films, sheets, containers, electric wires, cables, packings, sealants, hoses and injection-molded products.

SUMMARY OF THE INVENTION

The present invention resides in an abrasion-resistant flame-retardant composition comprising:
(I) 100 parts by weight of a polymer component containing:
  (A) 50–90% by weight, based on the total polymer weight, of a polyolefinic having a maximum peak temperature (Tm) of higher than 125° C. as measured by differential scanning calorimetry (DSC), and
  (B) 10–50% by weight, based on the total polymer weight of a polyethylenic resin or rubber having a maximum peak temperature (Tm) of lower than 125° C. as measured by DSC; and
(II) 30–200 parts by weight of an inorganic flame retardant, said polymer component (I) containing $10^{-8}-10^{-3}$ gram equivalent, based on 1 gram of the polymers, of at least one functional group selected from:
a: carboxyl group or an anhydride group thereof,
b: epoxy group,
c: hydroxyl group,
d: amino group,
e: alkenyl cyclic imino ether group, and
f: silane group.

DETAILED DESCRIPTION OF THE INVENTION

The present invention will be described in detail hereinunder.

As the polyolefinic resin having a maximum peak temperature (Tm) of higher than 125° C. as measured by differential scanning calorimetry (DSC), which is used as component A) in the present invention, it is preferable to use at least one member selected from the group consisting of polyethylenes not lower than 0.92 g/cm$^3$ in density and homopolymers and copolymers (both will sometimes be hereinafter referred to together as "(co)polymer"). The "polyethylenes not lower than 0.92 g/cm$^3$ in density" indicate high density polyethylenes prepared by a medium or low pressure polymerization according to a liquid phase process or a vapor phase process, using a Ziegler type catalyst used in the prior art. Such polyethylenes are ethylene homopolymer, copolymers of ethylene and α-olefins having 3 to 12 carbon atoms, and mixtures thereof. As examples of α-olefins there are mentioned propylene, 1-butane, 4-methyl-l-pentene, 1-hexene, 1-octane and 1-dodecene.

As examples of $C_3$ to $C_{12}$ α-olefin (co)polymers there are mentioned homopolymers and intercopolymers of such α-olefins as propylene, 1-butane, 4-methyl-1-pentene, 1-hexene, 1=octene and 1-dodecene, and ethylene as a comonomer. Above all, polypropylene, poly-1-butene, poly-4-methyl-1-pantene are preferred.

It is desirable that the melt flow rate (MFR) of such α-olefin (co)polymers be selected from the range of 0.01 to 20 g/10 min., more preferably 0.1 to 10 g/10 min., still more preferably 0.5 to 7 g/10 min. If MFR is lower than 0.01 g/10min., the processability will be deteriorated, and an MFR of higher than 20 g/10 min. will result in poor abrasion resistance.

As the polyethylenic resin or rubber having a maximum peak temperature (Tm) of lower than 125° C. as measured by differential scanning calorimetry (DSC), which is used as component B) in the present invention, it is preferable to use at least one member selected from the group consisting of (B1) low-density polyethylenes of 0.86 to less than 0.94 $g/cm^3$ in density prepared by a high pressure radical polymerization process or low-density ethylene/α-olefin copolymers of the same density range, (B2) ethylene-vinyl ester copolymers, (B3) ethylene/α, β-unsaturated carboxylic acid alkyl ester copolymers and (B4) rubbers.

The low-density polyethylenes prepared by a high pressure radical polymerization process or ethylene/α-olefin copolymers, of 0.86 to less than 0.94 $g/cm^3$ in density, as (B1), indicate low-density polyethylenes (LDPE) of 0.86 to less than 0.94 $g/cm^3$ in density prepared by a high pressure radical polymerization process and ethylene/$c_{3-12}$ α-olefin copolymers prepared by a medium or low pressure process using a Ziegler catalyst or any of other known methods, including very low density polyethylenes (VLDPE) of 0.86 to less than 0.91 $g/cm^3$ in density and linear low density polyethylenes (LLDPE) of 0.91 to less than 0.94 $g/cm^3$ in density.

As examples of α-olefins, mention may be made of propylene, 1-butene, 4-methyl-1-pentene, 1-hexene, 1-octene and 1-dodecene. α-olefins having 3 to 10 carbon atoms are preferred, e.g. 1-butene, 2-methyl-1-pentene, 1-hexene and 1-octene, with 1-butene being particularly preferred.

The α-olefin content in the ethylene copolymer is preferably in the range of 5 to 40 mole %.

The VLDPE indicates a polyethylene having a density of 0.86 $g/cm^3$ to less than 0.91 $g/cm^3$, a maximum peak temperature (Tm) of higher than 100° C. as measured by differential scanning calorimetry (DSC), a boiling n-hexane insolubles content of higher than 10 wt. %, and exhibiting properties intermediate between the linear low-density polyethylene and the ethylene/α-olefin copolymer rubber.

More particularly, the VLDPE is a copolymer of ethylene and an α-olefin having 3 to 12 carbon atoms and it is a resin having both a highly crystalline portion which LLDPE exhibits and an amorphous portion which the ethylene/α-olefin copolymer rubber exhibits. Mechanical strength and heat resistance which are characteristics of the former and self-tack, rubbery elasticity and low-temperature impact resistance which are characteristics of the latter, are present together in a well-balanced state. These characteristics are extremely useful in the present invention.

The VLDPE having such characteristics can be prepared using a catalyst system which is a combination of a solid catalyst component containing at least magnesium and titanium with an organoaluminum compound.

The ethylene-vinyl ester copolymers (B2) are copolymers prepared by a high pressure radical polymerization process and comprising ethylene as a main component and vinyl ester monomers such as vinyl propionate, vinyl acetate, vinyl caproate, vinyl caprylate, vinyl laurate, vinyl stearate and vinyl trifluoroacetate. Ethylene-vinyl acetate copolymer, especially a copolymer comprising 50–99.5 wt. % of ethylene, and 0.5–50 wt. % of vinyl acetate is preferred.

As examples of the ethylene/α, β-unsaturated carboxylic acid alkyl ester copolymers (B3) there are mentioned ethylene/α, β-unsaturated carboxylic ester copolymers and their metallic salts, amides and imides. They are preferably prepared by a high pressure radical polymerization process. Examples are ethylene-methyl (meth) acrylate copolymer and ethylene-ethyl (meth)acrylate copolymer. Especially, ethylene-ethyl acrylate copolymer (EEA), such as a copolymer comprising 50–99.5 wt. % of ethylene, and 0.5–50 wt. % of ethyl acrylate is preferred.

As examples of the rubbers (B4) there are mentioned ethylene propylene rubber, butadiene rubber, isoprene rubber, natural rubber, nitrile rubber and isobutylene rubber. These rubbers may be used each alone or in combination.

Examples of the ethylene propylene rubber include a random copolymer (EPM) containing ethylene and propylene as main components, and a random copolymer (EPDM) containing a diene monomer (e.g. dicyclopentadiene or ethylidene norbornene) as a third component in addition to ethylene and propylene.

Examples of the butadiene rubber, which indicates a copolymer containing butadiene as a constituent, are styrene-butadiene block copolymer (SBS), styrene-butadiene-ethylene copolymer (SBES) as a hydrogenated or partially hydrogenated derivative of SBS, 1,2-polybutadiene (1,2-PB), maleic anhydride-butadiene-styrene copolymer, and modified butadiene rubber having a core-shell structure.

Examples of the isoprene rubber, which indicates a copolymer containing isoprene as a constituent, are styrene-isoprene block copolymer (SIS), styrene-isoprene-ethylene copolymer (SIES) as a hydrogenated or partially hydrogenated derivative of SIS, and modified isoprene rubber having a core-shell structure.

Among those exemplified as component B), ethylenic polymer or rubber, in the present invention, ethylene-ethyl acrylate copolymer is most preferred.

It is desirable that the MFR of the ethylene-ethyl acrylate copolymer be selected from the range of 0.1 to 50 g/10 min., preferably 0.5 to 20 g/10 min. If the MFR is lower than 0.1 g/10 min., the fluidity of the resulting resin composition will be poor, and if it exceeds 50 g/10 min., there will arise deterioration of tensile strength, etc.

Preferable EEA has an EA content of 0.5–50 wt. %, more preferably 5–30 wt. % in view of economical reason and physical properties.

The functional group contained in the polymer component (I) in the present invention is at least one functional group selected from a: carboxyl group or an anhydride group thereof, b: epoxy group, c: hydroxyl group, d: amino group, e: alkenyl cyclic imino ether group and f: silane group. The functional group(s) may be introduced by introducing a monomer which contains the functional group into component A) and/or component B) by graft or random copolymerization. Further, the functional group(s) may be introduced by first introducing the functional group(s) into a part of component A) and/or component B) or a polymer other than components A) and B) in the same manner as above and then blending the graft modified polymer C) or random copolymerized polymer D with components A) and B). The latter is preferred. As a polymer to be grafted or randam copolymerized, a polyolefin resin or rubber is preferred. Examples thereof include graft-modified copolymer in which at least one kind of monomer containing the functional group(s) is grafted to a polyolefinic resin or rubber, and a random copolymer in which at least one kind of monomer containing the functional group is copolymerized with a polyolefinic resin or rubber.

As examples of monomers which derive the functional group a: carboxyl group or an anhydride group thereof, there are mentioned such $\alpha$, $\beta$-unsaturated dicarboxylic acids as maleic acid, fumaric acid, citraconic acid and itaconic acid, such unsaturated monocarboxylic acids as acrylic acid, methacrylic acid, furoic acid, crotonic acid, vinyl acetic acid and pentenoic acid, as well as esters and anhydrides of those monodicarboxylic acids.

As examples of monomers which derive b: epoxy group there are mentioned such glycidyl esters as glycidyl acrylate, glycidyl methacrylate, itaconic acid monoglycidyl ester, butenetricarboxylic acid monoglycidyl ester, butenetricarboxylic acid diglycidyl ester, butenetricarboxylic acid triglycidyl ester, as well as glycidyl esters of maleic, crotonic and fumaric acids, such glycidyl ethers as vinyl glycidyl ether, allyl glycidyl ether, glycidyloxyethylvinyl ether and styrene-p-glycidyl ether, and p-glycidylstyrene. Particularly preferred are glycidyl methacrylate and allyl glycidyl ether.

As examples of monomers which derive c: hydroxyl group there are mentioned 1-hydroxypropyl (meth)acrylate, 2-hydroxypropyl (meth)acrylate and hydroxyethyl (meth)acrylate.

As examples of monomers which derive d: amino group there are mentioned aminoethyl (meth)acrylate, propylaminoethyl (meth)acrylate, dimethylaminoethyl (meth)acrylate, diethylaminoethyl (meth)acrylate, dibutylaminoethyl (meth)acrylate, aminopropyl (meth)acrylate, phenylaminoethyl (meth)acrylate and cyclohexylaminoethyl (meth)acrylate.

As examples of monomers which derive e: alkenyl cyclic imino ether group there are mentioned compounds represented by the following structural formula:

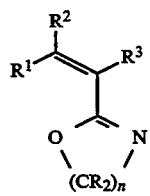

where n is 1, 2 or 3, preferably 2 or 3, more preferably 2, $R^1$, R2, R3 and R each represent an inert alkyl group having to ]2 carbon atoms and/or hydrogen, in which the alkyl group may contain an inert substituent group. The term "inert" as used herein means that no bad influence is exerted on graft reaction or the function of the resulting product. It is not necessary that all the Rs be the same. Preferably, $R^1 = R^2 = H$, $R^3 = H$ or Me, $R = H$. That is, the monomers in question are 2-vinyl and/or 2-isopropenyl-2-oxazoline and 2-vinyl and/or 2-isopropenyl-5,6-dihydro-4H-1,3-oxazine. These may be used each alone or in combination. Particularly, 2-vinyl and/or 2-isopropenyl-2-oxazoline is preferred.

As examples of monomers which derive f: silane group, that is, as examples of unsturated silane compounds, there are mentioned vinyltrimethoxysilane, vinyltriethoxysilane, vinyltriacetoxysilane and vinyltrichlorosilane.

For incorporating the functional group(s) in the polymer component (I), as mentioned previously, there may be used a graft polymer in which at least one functional group is grafted to component A) or component B), or there may be used component B) which is in the form of a random copolymer containing the functional group(s). Or a mixture of those copolymers may be used.

In the case where a functional group-containing polymer C) or D) is blended with the components A) and B) to prepare the component (I), there may be used, a graft polymer with the functional group(s) grafted to component A) or B), or component B) which is in the form of a random copolymer containing the functional group(s), or a mixture thereof.

Also, the components A), B) and the functional group-containing compound can be blended in the presence of a organic peroxide and the like in an extruder to take place an addition reaction.

Among these functional group-containing polyolefinic resins, maleic anhydride-modified polyethylenes are most preferred.

According to a graft copolymer preparing method adopted in the present invention, the graft copolymer is prepared by subjecting at least one compound having the functional group(s) to a graft copolymerization in the presence or absence of a solvent and with or without a radical initiator, with the melting method being particularly preferred.

As examples of the radical initiator there are mentioned organic peroxides, dihydroaromatic compounds and dicumyl compounds.

In the case of peroxide decomposing type polymers such as polypropylenes, since the polymer chain is cut by the peroxide, it is desirable to use a dicumyl compound or a dihydroaromatic compound as a relatively mild radical initiator.

Suitable examples of such organic peroxides are hydroperoxide, dicumyl peroxide, t-butylcumyl peroxide, dialkyl(allyl) peroxide, diisopropylbenzene hydroperoxide, dipropionyl peroxide, dioctanoyl peroxide, benzoyl peroxide, peroxysuccinic acid, peroxyketal, 2,5-dimethyl-2,5-di-(t-butylperoxy)hexane, t-butyloxyacetate and t-butylperoxyisobutyrate.

As examples of the foregoing dihydroaromatic compounds there are mentioned dihydroquinoline and derivatives thereof, dihydrofuran, 1,2-dihydrobenzene, 1,2-dihydronaphthalene and 9,10-dihydrophenanthrene.

As examples of the dicumyl compounds there are mentioned 2,3-dimethyl-2,3-diphenylbutane, 2,3-diethyl-2,3-diphenylbutane, 2,3-diethyl-2,3-di-(p-methylphenyl)butane and 2,3-diethyl-2,3-di-(p-bromophenyl), with 2,3-diethyl-2,3-diphenylbutane being particularly preferred.

As examples of the inorganic flame retardant which is used as component (II) in the present invention, there are mentioned aluminum hydroxide, magnesium hydroxide, zirconium hydroxide, basic magnesium carbonate, dolomite, hydrotalcite, calcium hydroxide, barium hydroxide, hydrate of tin oxide, hydrates of inorganometallic compounds e.g. borax, zinc borate, zinc metaborate, barium metaborate, zinc carbonate, magnesium-calcium carbonate, calcium carbonate, barium carbonate, magnesium oxide, molybdenum oxide, zirconium oxide and tin oxide.

These compounds may be used each alone or in combination of two or more. Above all, a hydrate of at least one metallic compound selected from the group consisting of aluminum hydroxide, magnesium hydroxide, zirconium hydroxide, basic magnesium carbonate, dolomite and hydrotalcite exhibits an excellent flame-retardant effect and is advantageous also from the economic point of view, with aluminum hydroxide and magnesium hydroxide being particularly preferred.

The particle diameter of the inorganic flame retardant differs depending on the kind thereof, but in the case of aluminum hydroxide and magnesium hydroxide, an average particle diameter is not larger than 20 $\mu$m, preferably not larger than 10 $\mu$m.

Red phosphorus employable in the present invention are preferably coated with an organic compound and/or an inorganic compound.

Examples of such coated red phosphorus are those obtained by coating the surfaces of red phosphorus particles with thermosetting resins such as, for example, epoxy resins, phenolic resins, polyester resins, silicone resins, polyamide resins and acrylic resins, those obtained by coating the particle surfaces first with, for example, aluminum oxide, zinc or magnesium and then further with such thermosetting resins as just exemplified above, those obtained by first making the particle surfaces into a metal phosphide and thereafter coating them with the thermosetting resins, and those obtained by coating the particle surfaces with compound hydrated oxides of metals such as titanium, cobalt and zirconium. Thus, these modified forms of red phosphorus are mentioned as examples.

It is preferable that an average particle diameter of red phosphorus be in the range of 5 to 30 $\mu$m and that the content of red phosphorus particles smaller than 1 $\mu$m and those larger than 100 $\mu$m be lower than 5 wt. %. Further, it is preferred that in the case of a compound hydrated oxide of, for example, titanium and cobalt, the amount of deposited coating on the red phosphorus particle surface be in the range of 0.5 to 15 wt. % as metal components (Ti+Co) based on the total weight and that likewise it be in the range of 0.1 to 20 wt. % based on the total weight in the case of an organic resin coating.

Such modified red phosphorus is superior in thermal stability and resistance to hydrolysis, whereby a hydrolysis reaction in the presence of water or at a high temperature is prevented almost completely, and hence there will be no evolution of phosphine gas which is smelly and poisonous.

The amount of red phosphorus used is usually in the range of 0.1 to 20 parts by weight, preferably 0.2 to 15 parts by weight, based on 100 parts by weight or resin component. An amount thereof smaller than 0.1 part by weight will be less effective, and even if red phosphorus is used in an amount exceeding 20 parts by weight, the flame retarding effect will not be improved any further and thus such amount is not desirable from the standpoint of physical properties and also from the economic point of view.

As examples of a crosslinking aid employable in the present invention there are mentioned conventional polyfunctional compounds, such as polyfunctional methacrylate monomers typified by trimethylolpropane trimethacrylate, ethylene glycol dimethacrylate and diethylene glycol dimethacrylate, polyfunctional vinyl monomers typified by triallyl isocyanurate, diallyl phthalate and vinyl butyrate, bismaleimides typified by N,N'-m-phenylenebismaleimide and N,N'=ethylenebismaleimide, dioximes such as p-quinone dioxime, divinyl compounds such as divinylbenzene, 1,5-hexadiene-3-yne, hexatriene, divinyl ether and divinyl sulfone, allyl phthalate, 2,6-diacrylphenol and such diallyl compound as diallylcarbinol. Such conventional polyfunctional crosslinking aids are exemplified in various references such as I&EC PRODUCT RESEARCH AND DEVELOPMENT P202 VOL2 NO. 3 SEPTEMBER 1963.

The amount of the polyfunctional monomer used in the invention is usually in the range of 1 to 20, preferably 5 to 10, parts by weight relative to 100 parts by weight of resin component. If it is smaller than 1 part by weight, there will not be obtained a sufficient degree of crosslinking, and even if it exceeds 20 parts by weight, the degree of crosslinking will not be so high and thus such a large amount is rather uneconomical.

It is important for the composition of the present invention to contain components A), B) and (II), or components A), B), C) or D) and (II), as essential components, and further contain in the polymer component $10^{-8}-10^{-3}$ g·equivalent, preferably $10^{-7}-10^{-4}$ g·equivalent, based on 1 g of the total polymers, of at least one kind of functional group selected from a to f. For incorporating such predetermined amount of the functional group in the polymer component, there may be used, as noted previously, a graft polymer with the functional group grafted to component A) and/or component B), or there may be used as component B) a random copolymer of ethylene and a monomer containing the functional group, or separately there may be used a functional group-containing polyolefinic resin or rubber which may be either component A) or B). Anyhow, it is important to control the content of the functional group so as to be $10^{-8}$–$10^{-3}$ g·equivalent per 1 g·of the total polymers.

In the case of a graft modified polyolefinic resin, the functional group content is usually in the range of $10^{-8}$ to $10^{-5}$ g.eq., preferably $10^{-7}$ to $10^{-6}$ g. eq.. If it is lower than $10^{-8}$ g·eq., a coupling effect of the polymer components (I) and (II) and the inorganic flame retardant is difficult to be developed, while a graft modified polyolefinic polymer having a functional group content exceeding $10^{-5}$ g·eq. is difficult to be manufactured. In the case of a random copolymer with olefin, a suitable functional group content is usually selected in the range of $10^{-6}$ to $10^{-3}$ g·eq., preferably $10^{-5}$ to $10^{-4}$ g·eq.. If the content is less than $10^{-6}$ g·eq., it will be difficult to attain a coupling effect of the resin component and the inorganic flame retardant, while as to a functional group content exceeding $10^{-3}$ g·eq., not only it is difficult to produce a random copolymer having such a high content, but also there is a fear of deterioration in mechanical strength of the resulting composition.

In the present invention, "gram equivalent" means the number of moles of monomer which derives the functional group per 1 gram of the entire polymers contained in the composition.

In the composition of the present invention, components A) and B) are present in such proportions, based on the entire polymer component, as 50–10 wt. % component B) relative to 50–90 wt. % component A), preferably 20–20 wt. % component B) relative to 60–80 wt. % component A).

A proportion of component B) less than 10 wt. % will result in a small amount of the inorganic flame retardant accepted, deterioration of mechanical strength and difficulty in enhancing the flame retarding effect. On the other hand, if it is more than 50 wt. %, the proportion of the polyolefin resin as component A becomes smaller than 50 wt. %, thus causing deterioration in processability, flexibility, abrasion resistance and heat resistance.

If the proportion of the inorganic flame retardant as component (II) is less than 30 parts by weight, it becomes necessary to use an organic flame retardant in combination with the inorganic flame retardant because with the latter alone it will be difficult to attain a satisfactory flame retardancy. On the other hand, a proportion thereof exceeding 200 parts by weight will result in deterioration of abrasion resistance and of mechanical strength, e.g. impact resistance, loss of flexibility and poor low-temperature charcteristics.

In the present invention, moreover, the composition described above may be combined with an inorganic filler, whereby it is made possible to reduce the amount of the flame retardant used and impart other characteristics to the composition.

As examples of such inorganic filler there are mentioned calcium sulfate, calcium silicate, clay, diatomaceous earth, talc, alumina, silica sand, glass powder, iron oxide, metal powder, graphite, silicon carbide, silicon nitride, silica, boron nitride, aluminum nitride, carbon black, mica, glass plate, sericite, pyrophyllite, aluminum flake, graphite, metal balloon, glass balloon, pumice stone, glass fiber, carbon fiber, whisker, metallic fiber, graphite fiber, silicon carbide fiber, asbestos and wollastonite.

These inorganic fillers may be used in an amount up to 100 parts by weight or so relative to 100 parts by weight of the composition of the present invention. An amount thereof exceeding 100 parts by weight is not desirable because mechanical characteristics, including impact strength, of molded articles obtained using the composition of the invention will be deteriorated.

In the case of using any of the inorganic flame retardants or fillers exemplified above in the invention, it is desirable to treat, for example, coat, the surface thereof with a fatty acid such as stearic acid, oleic acid or palmitic acid, or a metallic salt thereof, or paraffin, wax, polyethylene wax, or modified compounds thereof, an organoborane or an organic titanate.

How to prepare the crosslinkable, highly flame-retardant composition superior in abrasion resistance of the present invention is not specially limited. There may be adopted a known method.

For example, components A), B), C) or D) (II), red phosphorus and a crosslinking aid, as well as other additives if necessary, are dry-blended by means of a conventional tumbler or the like, or melt-kneaded for uniform dispersion by means of a conventional kneading machine such as, for example, Banbury mixer, pressure kneader, kneader/extruder, twin-screw extruder or rolls, to produce a mixture of resin composition or a molded product thereof.

Subsequently, crosslinking is allowed to take place, which may be done by heating, or in warm water, or by the application of electron beam or high energy radiation. There may be adopted a method which affords a crosslinked product simultaneously with the production of the aforesaid mixture of resin composition or molded product.

How to effect crosslinking using the composition of the present invention is not specially limited. There may be adopted any of a method using a crosslinking agent, a method involving the application of electron beam or such high energy radiation as $\beta$-ray or $\gamma$-ray, and an aqueous crosslinking method using a silane compound or a titanate compound.

It is desirable for the flame-retardant composition after crosslinking to have a gel content of not lower than 70%, more preferably not lower than 75%. If the gel content is lower than 70%, the effect of improvement in abrasion resistance, heat resistance and flame retardancy will be unsatisfactory. The higher the gel content, the more outstanding the said effect, which is desirable.

As the crosslinking agent there may be used, for example, a crosslinking agent based on a free radical mechanism such as an organic peroxide, a crosslinking agent for natural and synthetic rubbers such as a sulfur compound, or a silane compound. But in the case of a peroxide decomposing type polymer such as polypropylene, since he polymer chain is cut by the peroxide$^s$, it is desirable to use a relatively mild crosslinking agent such as, for example, a dicumyl compound or a dihydroaromatic compound.

The components of the composition of the present invention are considered to play the following roles:

The polyolefin resin as component A) having a maximum peak temperature (Tm) of higher than 125° C. as measured by differential scanning calorimetry (DSC) plays the role of remarkably improving abrasion resistance and heat resistance.

The ethylene (co)polymer or rubber as component B) having a maximum peak temperature (Tm) of lower than 125° C. as measured by DSC plays the role of increasing the amount of the inorganic flame retardant accepted without deteriorating the mechanical strength and also functions to improve flexibility and impact resistance.

The inorganic flame retardant as component (II) plays the role of affording a non-halogen type flame-retardant composition.

Component A) or B) containing a functional group and a polyolefin resin or rubber containing a functional group as component C) or D) exhibit a coupling effect for the resin component and the inorganic flame retardant as component (II) and play the role of enhancing the compatibility of the resins with each other, improving mechanical strength, abrasion resistance, heat resistance and processability and further improving the antidripping property by the formation of char during combustion.

Red phosphorus plays the role of making the composition of the invention flame-retardant to a higher extent, and the crosslinking aid functions to enhance the crosslinking efficiency and thereby further improve the flame retardancy and abrasion resistance.

Within the range not impairing the physical properties of the flame-retardant composition of the present invention there may be added at least one kind of a flaw and whitening preventing agent selected from ① mineral oil, wax, paraffins, ② higher fatty acids and their esters, amides or metallic salts, ③ silicone and ④ partial fatty acid esters of polyhydric alcohols, fatty acid alcohols, fatty acids, fatty acid amides, alkylphenols or alkylnaphthol alkylene oxide adducts, as well as organic filler, antioxidant, lubricant, organic or inorganic pigments, ultraviolet inhibitor, dispersant, copper damage preventing agent, neutralizer, plasticizer, nucleating agent, etc.

EXAMPLES

The present invention will be described below concretely by way of examples, but it is to be understood that the invention is not limited by those examples.

Resins and Materials used

Component A)

A1: High density polyethylene (HDPE) (Density=0.950 g/cm$^3$, MFR=1.0 g/10 min, $T_m$=129° C., a product of Nippon Petrochemicals Co., Ltd.)

A2: Polypropylene (PP) (Density=0.90 g/cm$^3$, MFR=1.0 g/10 min, $T_m$=167° C., a product of Nippon Petrochemicals Co., Ltd.)

Component B)

B1-1: Low density polyethylene (LDPE) (Density=0.922 g/cm$^3$, MFR=1.0 g/10 min., $T_m$=108° C., a product of Nippon Petrochemicals Co., Ltd.)

B1-2: Linear low density polyethylene (LLDPE) (Density=0.922 g/cm$^3$, MFR=10 g/10 min, $T_m$=22° C., a product of Nippon Petrochemicals Co., Ltd.)

B1-3: Ethylene/1-butene copolymer (VLDPE) (Density=0.900 g/cm$^3$, MFR=10 g/10 min, $T_m$=20° C. a product of Nippon Petrochemicals Co., Ltd.)

B2: Ethylene/vinyl acetate copolymer (EVA) (VA content=10 wt. %, MFR=1.0 g;/10 min., $T_m$=97° C., a product of Nippon Petrochemicals Co., Ltd.)

B3: Ethylene/ethyl acrylate copolymer (EA content=10 wt. %, MFR=0.4 g/10 min., a product of Nippon Petrochemicals Co., Ltd.)

B4: Ethylene/propylene copolymer rubber (Propylene=27 wt. %, MFR=0.7 g;/10 min., $T_m$=67° C., EPO7P, a product of Japan Synthetic Rubber Co., Ltd.)

Component C)

C1: Maleic anhydride-modified ethylene/butene-1 copolymer (MAnLL) (Density=0.92 g/cm$^3$, MFR=1.2 g/10 min, Reacting weight of maleic anhydride=0.2 wt. %, a product of Nippon Petrochemicals Co., Ltd.)

C2: Alkenyl cyclic imino ether-modified ethylene/butene-1 copolymer (hereinafter referred to as "Alkenyl") (Density=0.92 g/cm$^3$ MFR=1.2 g/10 min, Reacting weight=0.2 wt. %, a product of Nippon Petrochemicals Co., Ltd.)

C3: Vinyltrimethoxysilane-modified ethylene-butene-1 copolymer (Density=0.91 g/cm$^3$, MFR=1.2 g/10 min., Reacting weight=0.2 wt. %, a product of Nippon Petrochemicals Co., Ltd.)

Component D)

D1: Ethylene glycidyl methacrylate (E-GMA) (Density=0.935 g/cm$^3$, MFR=4.0 g/10 min., GMA concentration=10 wt. %, a product of Nippon Petrochemicals Co., Ltd.)

Component E)

E1: Magnesium hydroxide (Trade name: Kisuma 5J, a product of Kyowa Kagaku K.K.)

E2: Aluminum hydroxide (Trade name: Higilite 42M, a product of Nippon Light Metal Company, Ltd.)

Red Phosphorus

Crosslinking Aid

Trimethylolpropane trimethacrylate (TMPT)

(Testing Method)

(1) Tensile Test (kg/cm$^2$)(designated YTS, UTS) and Elongation (%)(designated UEL)

A test piece was obtained by blanking from a 1 mm hick sheet using No.3 dumbbell die, then subjected to measurement at a pulling speed of 200 mm/min. Using Tensilon.

(2) Oxygen Index (OI)

Determined according to JIB K7201.

(3) Abrasion Resistance Test (ASTM C501-84)

After testing at 1,000 revolutions and at a load of 1 kg, using a Taber abrader, truck wheel H-22, a reduction in weight (mg) was measured.

(4) Heat Deformation (Heat Resistance)

Determined according to JIS C3005 and JIS C3605 (Temperature: 100° C., load: 3 kgf).

Examples 1–10

After dry-blending compositions shown in Tables 1 to 8, the blends were each melt-kneaded and pelletized at a resin temperature of 200° C. using a 50 mm dia. extruder, followed by pressing at 180° C., a pressure of 100 kg/cm$^2$, for 5 minutes to obtain samples, which were then tested. The results of the tests are as set forth in Tables 1 to 8.

Comparative Examples 1–5

Without using component A), the inorganic flame retardant of component E) was mixed with component B) in Comparative Example 1, while in Comparative Examples 2 to 5, the maleic anhydride-modified LLDPE (MAnLL) of component C) and inorganic flame retardant of component E) were mixed with component B). Evaluation was made in the same way as in Example 1, the results of which are as shown in Table 9.

Comparative Examples 6–8

In comparative Example 6, 95 wt. % of HDPE was used as component A), and 5 parts by weight of MAnLL of component C) and 100 parts by weight of the inorganic flame retardant of component E) were mixed with component A), while in Comparative Examples 7 and 8, HDPE was used as component A), MAnLL was used as component C), 20 and 220 parts by weight of the inorganic flame retardant were used respectively. The results are shown in table 9. Evaluation was made in the same way as in Example 1, the results of which are as shown in Table 9.

Comparative Examples 9-11

The procedure of Comparative Examples 6-8 was repeated except that PP was used as component. A). The results of evaluation are as shown in Table 9.

Comparative Examples 12-16

The procedure of Comparative Examples 1-5 was repeated except that red phosphorus was used. The results of evaluation are as shown in Table 10.

Comparative Examples 17-19

The procedure of Comparative Examples 6-8 was repeated except that red phosphorus was used. The results of evaluation are as shown in Table 10.

Comparative Examples 20-24

The procedure of Comparative Examples 1-5 was repeated except that a crosslinking aid was used. The results of evaluation are as shown in Table 10.

Comparative Examples 25-27

The procedure of Comparative Examples 6-8 was repeated except that a crosslinking aid was used. The results of evaluation are as shown in Table 11.

Comparative Examples 28-32

The procedure of Comparative Examples 12-16 was repeated except that a crosslinking aid was used. The results of evaluation are as shown in Table 11.

Comparative Examples 33-35

The procedure of Comparative Examples 17 and 18 was repeated except that a crosslinking aid was used. The results of evaluation are as shown in Table 11.

Examples 105-108

Using MAnLL, E-GMA, Alkenyl, VTMS as component (C) and E-GMA as components D), evaluation was made in the same manner as in Example 3, the results of which are as set forth in Table 12.

Comparative Example 36

Without using component C), evaluation was made in the same manner as in Example 3, the results of which are as set forth in Table 12.

Examples 1, 2, 3, 14, 15, 16, 109

Using 60-80 wt. % of PP as component A) and 20-20 wt. % of EEA or VLDPE as component B), evaluation was made in the same manner as in Example 1, the results of which are as set forth in Table 13.

Comparative Examples 2, 6, 37-43

Using 0-100 wt. % of HDPE or PP as component A) and 0-100 wt. % of EEA or VLDPE as component B), evaluation was made in the same manner as in Example 1, the results of which are as set forth in Table 13.

Effect of the Invention

Since the flame-retardant composition of the present invention comprises a resin component as component (I) and an inorganic flame retardant as component (II), the resin component (I) containing a specific amount of a specific functional group(s) and comprising components A) and B), the component A) being a polyolefin resin having a maximum peak temperature (Tm) of higher than 125° C. as measured by differential scanning calorimetry (DSC) and the component B) being an ethylene (co)polymer or rubber having a maximum peak temperature (Tm) of lower than 125° C. as measured by DSC, or it is a flame-retardant composition containing a specific amount of such functional group(s) in which is incorporated as component C) a polyolefin resin or rubber containing the functional group(s), there can be attained improvement of abrasion resistance and heat resistance while retaining flexibility, mechanical strength and high flame retardancy.

Particularly, the component A) contributes to the improvement of abrasion resistance and heat resistance because it is constituted by a crystalline resin, and the component B) enhances the receptivity of the inorganic flame retardant and can enhance the flame retarding effect without deterioration of mechanical strength and flexibility. The components A), B) and C), containing the functional group(s), play the role of coupling the resin component with the inorganic flame retardant or inorganic filler, enhance their mutual compatibility and improve mechanical strength, processability and abrasion resistance. They also contribute to the formation of char (a carbonized layer) during combustion and play the role of preventing dripping of the resins.

Thus, the resin composition of the present invention has a high flame retardancy, does not evolve such a poisonous gas as halogen gas during combustion, is superior in abrasion resistance and heat resistance and is also superior in safety, flexibility, mechanical characteristics, resistance to chemicals and electrical characteristics. Because of these excellent characteristics, the resin composition of the invention can be used for molding, for example, for the production of extrudates or injection-molded products, including films, sheets and pipes, further for electric wires and cables, and can be utilized in various fields, including the fields of fibers, electricity, electronics, automobiles, ships, aircraft, architecture and civil engineering.

TABLE 1

| | | Example Nos. 1-13 | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| A) | A1 HDPE | 80 | 70 | 60 | 60 | 60 | 60 | 70 | 70 | 70 | 60 | 60 | 60 | 60 |
| | A2 PP | | | | | | | | | | | | | |
| B) | B1-1 LDPE | | | | | | | | | | | | 30 | 10 |
| | B1-2 LLDPE | | | | | | | | | | 30 | 10 | | |
| | B1-3 VLDPE | | | | 40 | | | | | | | | | |
| | B2 EVA | | | | | 40 | | | | | | | | |
| | B3 EEA | 20 | 30 | 40 | | | | 30 | 30 | 30 | 10 | 30 | 10 | 30 |
| | B4 EPR | | | | | | 40 | | | | | | | |
| C) | C-1 MAnLL | 5 | 5 | 5 | 5 | 5 | 5 | | | 5 | 5 | 5 | 5 | 5 |
| | (10−7 g eq/g) | 9.2 | 9.2 | 9.2 | 9.2 | 9.2 | 9.2 | | | 9.2 | 9.2 | 9.2 | 9.2 | 9.2 |
| | C-3 alkenyl | | | | | | | | 5 | | | | | |
| | (10−7 g eq/g) | | | | | | | | 9.2 | | | | | |

TABLE 1-continued

| | | Example Nos. 1–13 | | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 | 13 |
| D) | D-1 E-GMA | | | | | | | 5 | | | | | | |
| | ($10^{-5}$ g eq/g) | | | | | | | 7.0 | | | | | | |
| E) | E-1 Mg(OH)$_2$ | 100 | 100 | 100 | 100 | 100 | 100 | 100 | 100 | | 100 | 100 | 100 | 100 |
| | E-2 Al(OH)$_3$ | | | | | | | | | 100 | | | | |
| | MFR | 0.20 | 0.25 | 0.27 | 0.21 | 0.22 | 0.23 | 0.24 | 0.26 | 0.24 | 0.30 | 0.25 | 0.21 | 0.22 |
| | YTS | 130 | 128 | 125 | 126 | 124 | 128 | 130 | 126 | 126 | 127 | 126 | 128 | 127 |
| | UTS | 120 | 124 | 125 | 127 | 132 | 125 | 130 | 128 | 127 | 128 | 120 | 124 |
| | UEL | 500 | 460 | 400 | 450 | 410 | 420 | 400 | 490 | 400 | 420 | 450 | 410 | 460 |
| | OI | 26.4 | 26.0 | 25.7 | 26.1 | 25.8 | 25.9 | 26.0 | 26.2 | 25.3 | 25.2 | 26.0 | 25.9 | 25.8 |
| Abrasion Resistance mg | | 40 | 53 | 60 | 61 | 59 | 58 | 47 | 48 | 55 | 53 | 52 | 51 | 50 |
| Heat Deformation % | | 4.2 | 5.3 | 5.6 | 5.5 | 5.3 | 5.0 | 4.6 | 5.0 | 4.8 | 4.7 | 5.1 | 5.5 | 5.2 |

TABLE 2

| | | Example Nos. 14–26 | | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 | 26 |
| A) | A1 HDPE | 80 | 70 | 60 | 60 | 60 | 60 | 70 | 70 | 70 | 60 | 60 | 60 | 60 |
| | A2 PP | | | | | | | | | | | | | |
| B) | B1-1 LDPE | | | | | | | | | | | | 30 | 10 |
| | B1-2 LLDPE | | | | | | | | | | 30 | 10 | | |
| | B1-3 VLDPE | | | | 40 | | | | | | | | | |
| | B2 EVA | | | | | 40 | | | | | | | | |
| | B3 EEA | 20 | 30 | 40 | | | | 30 | 30 | 30 | 10 | 30 | 10 | 30 |
| | B4 EPR | | | | | | 40 | | | | | | | |
| C) | C-1 MAnLL | 5 | 5 | 5 | 5 | 5 | 5 | | | 5 | 5 | 5 | 5 | 5 |
| | ($10^{-7}$ g eq/g) | 9.2 | 9.2 | 9.2 | 9.2 | 9.2 | 9.2 | | | 9.2 | 9.2 | 9.2 | 9.2 | 9.2 |
| | C-3 alkenyl | | | | | | | | 5 | | | | | |
| | ($10^{-7}$ g eq/g) | | | | | | | | 9.2 | | | | | |
| D) | D-1 E-GMA | | | | | | | 5 | | | | | | |
| | ($10^{-5}$ g eq/g) | | | | | | | 7.0 | | | | | | |
| E) | E-1 Mg(OH)$_2$ | 100 | 100 | 100 | 100 | 100 | 100 | 100 | 100 | | 100 | 100 | 100 | 100 |
| | E-2 Al(OH)$_3$ | | | | | | | | | 100 | | | | |
| | MFR | 0.21 | 0.25 | 0.27 | 0.20 | 0.21 | 0.23 | 0.24 | 0.26 | 0.22 | 0.23 | 0.21 | 0.22 | 0.24 |
| | YTS | 137 | 135 | 130 | 128 | 128 | 129 | 133 | 127 | 129 | 129 | 130 | 131 | 129 |
| | UTS | 120 | 123 | 125 | 126 | 130 | 123 | 125 | 128 | 126 | 123 | 124 | 127 | 125 |
| | UEL | 400 | 420 | 440 | 420 | 460 | 440 | 420 | 480 | 420 | 420 | 440 | 450 | 460 |
| | OI | 26.2 | 26.2 | 25.9 | 26.1 | 25.9 | 26.1 | 26.0 | 25.7 | 26.1 | 25.8 | 25.9 | 26.0 | 25.8 |
| Abrasion Resistance mg | | 38 | 50 | 57 | 50 | 42 | 40 | 41 | 58 | 52 | 49 | 51 | 50 | 49 |
| Heat Deformation % | | 4.5 | 5.2 | 5.5 | 4.6 | 4.5 | 4.9 | 4.7 | 4.8 | 5.3 | 5.7 | 5.4 | 5.9 | 5.8 |

TABLE 3

| | | Example Nos. 27–39 | | | | | | | | | | | | |
|---|---|---|---|---|---|---|---|---|---|---|---|---|---|
| | | 27 | 28 | 29 | 30 | 31 | 32 | 33 | 34 | 35 | 36 | 37 | 38 | 39 |
| A) | A1 HDPE | 80 | 70 | 60 | 60 | 60 | 60 | 70 | 70 | 70 | 60 | 60 | 60 | 60 |
| | A2 PP | | | | | | | | | | | | | |
| B) | B1-1 LDPE | | | | | | | | | | | | 30 | 10 |
| | B1-2 LLDPE | | | | | | | | | | 30 | 10 | | |
| | B1-3 VLDPE | | | | 40 | | | | | | | | | |
| | B2 EVA | | | | | 40 | | | | | | | | |
| | B3 EEA | 20 | 30 | 40 | | | | 30 | 30 | 30 | 10 | 30 | 10 | 30 |
| | B4 EPR | | | | | | 40 | | | | | | | |
| C) | C-1 MAnLL | 5 | 5 | 5 | 5 | 5 | 5 | | | 5 | 5 | 5 | 5 | 5 |
| | ($10^{-7}$ g eq/g) | 9.2 | 9.2 | 9.2 | 9.2 | 9.2 | 9.2 | | | 9.2 | 9.2 | 9.2 | 9.2 | 9.2 |
| | C-3 alkenyl | | | | | | | | 5 | | | | | |
| | ($10^{-7}$ g eq/g) | | | | | | | | 9.2 | | | | | |
| D) | D-1 E-GMA | | | | | | | 5 | | | | | | |
| | ($10^{-5}$ g eq/g) | | | | | | | 7.0 | | | | | | |
| E) | E-1 Mg(OH)$_2$ | 100 | 100 | 100 | 100 | 100 | 100 | 100 | 100 | | 100 | 100 | 100 | 100 |
| | E-2 Al(OH)$_3$ | | | | | | | | | 100 | | | | |
| Red phosphorus | | 3 | 3 | 3 | 3 | 3 | 3 | 3 | 3 | 3 | 3 | 3 | 3 | 3 |
| | MFR | 0.26 | 0.22 | 0.23 | 0.22 | 0.25 | 0.28 | 0.28 | 0.25 | 0.23 | 0.26 | 0.24 | 0.21 | 0.25 |
| | YTS | 129 | 127 | 124 | 125 | 126 | 127 | 123 | 126 | 124 | 126 | 123 | 127 | 128 |
| | UTS | 121 | 122 | 125 | 126 | 126 | 131 | 129 | 126 | 126 | 123 | 126 | 128 | 124 |
| | UEL | 440 | 460 | 440 | 440 | 440 | 470 | 420 | 440 | 460 | 420 | 470 | 480 | 460 |
| | OI | 29.4 | 29.3 | 29.3 | 29.9 | 29.2 | 29.5 | 29.2 | 29.7 | 30.3 | 29.8 | 29.5 | 29.6 | 29.8 |
| Abrasion Resistance mg | | 43 | 55 | 61 | 59 | 48 | 49 | 57 | 54 | 56 | 53 | 51 | 58 | 56 |
| Heat Deformation % | | 4.3 | 5.2 | 5.7 | 5.2 | 4.6 | 5.3 | 5.0 | 4.9 | 5.0 | 5.2 | 5.4 | 5.1 | 4.8 |

TABLE 4

| | | Example Nos. 40–52 | | | | | | | | | | | | |
|---|---|---|---|---|---|---|---|---|---|---|---|---|---|
| | | 40 | 41 | 42 | 43 | 44 | 45 | 46 | 47 | 48 | 49 | 50 | 51 | 52 |
| A) | A1 HDPE | | | | | | | | | | | | | |

TABLE 4-continued

Example Nos. 40–52

| | | 40 | 41 | 42 | 43 | 44 | 45 | 46 | 47 | 48 | 49 | 50 | 51 | 52 |
|---|---|---|---|---|---|---|---|---|---|---|---|---|---|---|
| | A2 PP | 80 | 70 | 60 | 60 | 60 | 60 | 70 | 70 | 70 | 60 | 60 | 60 | 60 |
| B) | B1-1 LDPE | | | | | | | | | | | | 30 | 10 |
| | B1-2 LLDPE | | | | | | | | | | 30 | 10 | | |
| | B1-3 VLDPE | | | | 40 | | | | | | | | | |
| | B2 EVA | | | | | 40 | | | | | | | | |
| | B3 EEA | 20 | 30 | 40 | | | | 30 | 30 | 30 | 10 | 30 | 10 | 30 |
| | B4 EPR | | | | | | 40 | | | | | | | |
| C) | C-1 MAnLL | 5 | 5 | 5 | 5 | 5 | 5 | | | 5 | 5 | 5 | 5 | 5 |
| | ($10^{-7}$ g eq/g) | 9.2 | 9.2 | 9.2 | 9.2 | 9.2 | 9.2 | | | 9.2 | 9.2 | 9.2 | 9.2 | 9.2 |
| | C-3 alkenyl | | | | | | | | 5 | | | | | |
| | ($10^{-7}$ g eq/g) | | | | | | | | 9.2 | | | | | |
| D) | D-1 E-GMA | | | | | | | 5 | | | | | | |
| | ($10^{-5}$ g eq/g) | | | | | | | 7.0 | | | | | | |
| E) | E-1 Mg(OH)$_2$ | 100 | 100 | 100 | 100 | 100 | 100 | 100 | 100 | | 100 | 100 | 100 | 100 |
| | E-2 Al(OH)$_3$ | | | | | | | | | 100 | | | | |
| Red phosphorus | | 3 | 3 | 3 | 3 | 3 | 3 | 3 | 3 | 3 | 3 | 3 | 3 | 3 |
| MFR | | 0.22 | 0.24 | 0.25 | 0.21 | 0.20 | 0.26 | 0.25 | 0.26 | 0.20 | 0.29 | 0.28 | 0.23 | 0.24 |
| YTS | | 132 | 130 | 128 | 127 | 128 | 126 | 128 | 125 | 126 | 127 | 125 | 128 | 131 |
| UTS | | 120 | 123 | 126 | 126 | 128 | 130 | 128 | 127 | 129 | 127 | 128 | 129 | 127 |
| UEL | | 400 | 420 | 430 | 430 | 410 | 450 | 420 | 430 | 440 | 400 | 460 | 440 | 450 |
| OI | | 30.2 | 30.4 | 30.6 | 30.4 | 29.9 | 30.3 | 30.0 | 30.1 | 30.0 | 30.4 | 30.1 | 30.2 | 29.9 |
| Abrasion Resistance mg | | 39 | 43 | 55 | 53 | 47 | 45 | 51 | 50 | 52 | 51 | 52 | 56 | 51 |
| Heat Deformation % | | 3.9 | 5.0 | 5.5 | 5.0 | 4.4 | 5.0 | 4.9 | 4.6 | 4.8 | 5.0 | 5.1 | 5.0 | 4.5 |

TABLE 5

Example Nos. 53–65

| | | 53 | 54 | 55 | 56 | 57 | 58 | 59 | 60 | 61 | 62 | 63 | 64 | 65 |
|---|---|---|---|---|---|---|---|---|---|---|---|---|---|---|
| A) | A1 HDPE | 80 | 70 | 60 | 60 | 60 | 60 | 70 | 70 | 70 | 60 | 60 | 60 | 60 |
| | A2 PP | | | | | | | | | | | | | |
| B) | B1-1 LDPE | | | | | | | | | | | | 30 | 10 |
| | B1-2 LLDPE | | | | | | | | | | 30 | 10 | | |
| | B1-3 VLDPE | | | | 40 | | | | | | | | | |
| | B2 EVA | | | | | 40 | | | | | | | | |
| | B3 EEA | 20 | 30 | 40 | | | | 30 | 30 | 30 | 10 | 30 | 10 | 30 |
| | B4 EPR | | | | | | 40 | | | | | | | |
| C) | C-1 MAnLL | 5 | 5 | 5 | 5 | 5 | 5 | | | 5 | 5 | 5 | 5 | 5 |
| | ($10^{-7}$ g eq/g) | 9.2 | 9.2 | 9.2 | 9.2 | 9.2 | 9.2 | | | 9.2 | 9.2 | 9.2 | 9.2 | 9.2 |
| | C-3 alkenyl | | | | | | | | 5 | | | | | |
| | ($10^{-7}$ g eq/g) | | | | | | | | 9.2 | | | | | |
| D) | D-1 E-GMA | | | | | | | 5 | | | | | | |
| | ($10^{-5}$ g eq/g) | | | | | | | 7.0 | | | | | | |
| E) | E-1 Mg(OH)$_2$ | 100 | 100 | 100 | 100 | 100 | 100 | 100 | 100 | | 100 | 100 | 100 | 100 |
| | E-2 Al(OH)$_3$ | | | | | | | | | 100 | | | | |
| Crosslinking Aid | | 5 | 5 | 5 | 5 | 5 | 5 | 5 | 5 | 5 | 5 | 5 | 5 | 5 |
| MFR | | 0.22 | 0.23 | 0.26 | 0.21 | 0.22 | 0.27 | 0.26 | 0.24 | 0.25 | 0.22 | 0.21 | 0.29 | 0.27 |
| YTS | | 128 | 125 | 125 | 126 | 127 | 123 | 124 | 123 | 121 | 124 | 125 | 126 | 125 |
| UTS | | 122 | 123 | 124 | 130 | 128 | 130 | 126 | 127 | 127 | 125 | 123 | 126 | 128 |
| UEL | | 430 | 450 | 450 | 450 | 430 | 460 | 410 | 430 | 450 | 430 | 450 | 460 | 470 |
| OI | | 26.2 | 26.6 | 26.4 | 26.8 | 26.3 | 26.3 | 26.2 | 26.6 | 26.3 | 26.6 | 26.4 | 26.7 | 26.4 |
| Electron beam exposure Mrd | | 15 | 15 | 15 | 15 | 15 | 15 | 15 | 15 | 15 | 15 | 15 | 15 | 15 |
| Abrasion Resistance mg | | 43 | 53 | 59 | 57 | 46 | 46 | 55 | 53 | 54 | 51 | 50 | 56 | 55 |
| Gelation % | | 86 | 87 | 83 | 88 | 87 | 83 | 81 | 85 | 86 | 87 | 83 | 81 | 82 |
| Heat Deformation % | | 3.1 | 3.9 | 4.4 | 4.1 | 3.2 | 4.3 | 4.0 | 3.7 | 4.2 | 4.3 | 4.3 | 4.3 | 3.9 |

TABLE 6

Example Nos. 66–78

| | | 66 | 67 | 68 | 69 | 70 | 71 | 72 | 73 | 74 | 75 | 76 | 77 | 78 |
|---|---|---|---|---|---|---|---|---|---|---|---|---|---|---|
| A) | A1 HDPE | | | | | | | | | | | | | |
| | A2 PP | 80 | 70 | 60 | 60 | 60 | 60 | 70 | 70 | 70 | 60 | 60 | 60 | 60 |
| B) | B1-1 LDPE | | | | | | | | | | | | 30 | 10 |
| | B1-2 LLDPE | | | | | | | | | | 30 | 10 | | |
| | B1-3 VLDPE | | | | 40 | | | | | | | | | |
| | B2 EVA | | | | | 40 | | | | | | | | |
| | B3 EEA | 20 | 30 | 40 | | | | 30 | 30 | 30 | 10 | 30 | 10 | 30 |
| | B4 EPR | | | | | | 40 | | | | | | | |
| C) | C-1 MAnLL | 5 | 5 | 5 | 5 | 5 | 5 | | | 5 | 5 | 5 | 5 | 5 |
| | ($10^{-7}$ g eq/g) | 9.2 | 9.2 | 9.2 | 9.2 | 9.2 | 9.2 | | | 9.2 | 9.2 | 9.2 | 9.2 | 9.2 |
| | C-3 alkenyl | | | | | | | | 5 | | | | | |
| | ($10^{-7}$ g eq/g) | | | | | | | | 9.2 | | | | | |
| D) | D-1 E-GMA | | | | | | | 5 | | | | | | |
| | ($10^{-5}$ g eq/g) | | | | | | | 7.0 | | | | | | |
| E) | E-1 Mg(OH)$_2$ | 100 | 100 | 100 | 100 | 100 | 100 | 100 | 100 | | 100 | 100 | 100 | 100 |
| | E-2 Al(OH)$_3$ | | | | | | | | | 100 | | | | |

TABLE 6-continued

| | | Example Nos. 66–78 | | | | | | | | | | | | |
|---|---|---|---|---|---|---|---|---|---|---|---|---|---|
| | | 66 | 67 | 68 | 69 | 70 | 71 | 72 | 73 | 74 | 75 | 76 | 77 | 78 |
| | Crosslinking Aid | 5 | 5 | 5 | 5 | 5 | 5 | 5 | 5 | 5 | 5 | 5 | 5 | 5 |
| | MFR | 0.23 | 0.26 | 0.22 | 0.24 | 0.22 | 0.24 | 0.23 | 0.28 | 0.25 | 0.23 | 0.24 | 0.21 | 0.27 |
| | YTS | 131 | 129 | 127 | 128 | 130 | 127 | 125 | 126 | 123 | 123 | 127 | 126 | 128 |
| | UTS | 122 | 121 | 124 | 125 | 124 | 132 | 125 | 124 | 128 | 121 | 123 | 126 | 124 |
| | UEL | 410 | 420 | 410 | 420 | 400 | 430 | 410 | 460 | 460 | 410 | 440 | 460 | 470 |
| | OI | 26.5 | 26.6 | 26.7 | 26.7 | 26.4 | 26.8 | 26.8 | 27.0 | 26.9 | 26.5 | 26.4 | 26.4 | 26.6 |
| | Electron beam exposure Mrd | 15 | 15 | 15 | 15 | 15 | 15 | 15 | 15 | 15 | 15 | 15 | 15 | 15 |
| Abrasion Resistance mg | | 35 | 40 | 53 | 50 | 44 | 41 | 48 | 50 | 50 | 49 | 50 | 52 | 49 |
| Gelation % | | 82 | 83 | 81 | 86 | 86 | 85 | 83 | 85 | 85 | 82 | 84 | 85 | 82 |
| Heat Deformation % | | 3.1 | 4.3 | 4.5 | 4.5 | 4.2 | 4.0 | 4.1 | 4.2 | 4.1 | 4.6 | 4.5 | 4.3 | 4.0 |

TABLE 7

| | | Example Nos. 79–91 | | | | | | | | | | | | |
|---|---|---|---|---|---|---|---|---|---|---|---|---|---|
| | | 79 | 80 | 81 | 82 | 83 | 84 | 85 | 86 | 87 | 88 | 89 | 90 | 91 |
| A) | A1 HDPE | 80 | 70 | 60 | 60 | 60 | 60 | 70 | 70 | 70 | 60 | 60 | 60 | 60 |
| | A2 PP | | | | | | | | | | | | | |
| B) | B1-1 LDPE | | | | | | | | | | | | 30 | 10 |
| | B1-2 LLDPE | | | | | | | | | | 30 | 10 | | |
| | B1-3 VLDPE | | | | 40 | | | | | | | | | |
| | B2 EVA | | | | | 40 | | | | | | | | |
| | B3 EEA | 20 | 30 | 40 | | | | | 30 | 30 | 30 | 10 | 30 | 10 | 30 |
| | B4 EPR | | | | | | 40 | | | | | | | |
| C) | C-1 MAnLL | 5 | 5 | 5 | 5 | 5 | 5 | | | 5 | 5 | 5 | 5 | 5 |
| | (10−7 g eq/g) | 9.2 | 9.2 | 9.2 | 9.2 | 9.2 | 9.2 | | | 9.2 | 9.2 | 9.2 | 9.2 | 9.2 |
| | C-3 alkenyl | | | | | | | | 5 | | | | | |
| | (10−7 g eq/g) | | | | | | | | 9.2 | | | | | |
| D) | D-1 E-GMA | | | | | | | 5 | | | | | | |
| | (10−5 g eq/g) | | | | | | | 7.0 | | | | | | |
| E) | E-1 Mg(OH)$_2$ | 100 | 100 | 100 | 100 | 100 | 100 | 100 | 100 | | 100 | 100 | 100 | 100 |
| | E-2 Al(OH)$_3$ | | | | | | | | | 100 | | | | |
| Red phosphorus | | 3 | 3 | 3 | 3 | 3 | 3 | 3 | 3 | 3 | 3 | 3 | 3 | 3 |
| Crosslinking Aid | | 5 | 5 | 5 | 5 | 5 | 5 | 5 | 5 | 5 | 5 | 5 | 5 | 5 |
| | MFR | 0.24 | 0.21 | 0.24 | 0.20 | 0.24 | 0.25 | 0.22 | 0.23 | 0.22 | 0.20 | 0.23 | 0.23 | 0.25 |
| | YTS | 130 | 125 | 123 | 125 | 128 | 122 | 121 | 123 | 124 | 126 | 127 | 124 | 124 |
| | UTS | 120 | 124 | 125 | 129 | 125 | 131 | 124 | 126 | 126 | 125 | 127 | 124 | 124 |
| | UEL | 420 | 440 | 450 | 410 | 440 | 470 | 430 | 430 | 410 | 450 | 460 | 450 | 410 |
| | OI | 29.4 | 29.3 | 29.5 | 29.5 | 29.1 | 29.7 | 29.5 | 29.1 | 29.6 | 29.9 | 29.1 | 29.3 | 29.6 |
| | Electron beam exposure Mrd | 15 | 15 | 15 | 15 | 15 | 15 | 15 | 15 | 15 | 15 | 15 | 15 | 15 |
| Abrasion Resistance mg | | 42 | 52 | 55 | 53 | 44 | 42 | 54 | 51 | 53 | 50 | 49 | 54 | 53 |
| Gelation % | | 83 | 84 | 80 | 85 | 85 | 87 | 88 | 82 | 83 | 85 | 89 | 83 | 86 |
| Heat Deformation % | | 3.2 | 3.8 | 4.3 | 4.0 | 3.3 | 4.1 | 4.2 | 3.5 | 4.1 | 4.3 | 4.0 | 4.1 | 4.1 |

TABLE 8

| | | Example Nos. 92–104 | | | | | | | | | | | | |
|---|---|---|---|---|---|---|---|---|---|---|---|---|---|
| | | 92 | 93 | 94 | 95 | 96 | 97 | 98 | 99 | 100 | 101 | 102 | 103 | 104 |
| A) | A1 HDPE | | | | | | | | | | | | | |
| | A2 PP | 80 | 70 | 60 | 60 | 60 | 60 | 70 | 70 | 70 | 60 | 60 | 60 | 60 |
| B) | B1-1 LDPE | | | | | | | | | | | | 30 | 10 |
| | B1-2 LLDPE | | | | | | | | | | 30 | 10 | | |
| | B1-3 VLDPE | | | | 40 | | | | | | | | | |
| | B2 EVA | | | | | 40 | | | | | | | | |
| | B3 EEA | 20 | 30 | 40 | | | | | 30 | 30 | 30 | 10 | 30 | 10 | 30 |
| | B4 EPR | | | | | | 40 | | | | | | | |
| C) | C-1 MAnLL | 5 | 5 | 5 | 5 | 5 | 5 | | | 5 | 5 | 5 | 5 | 5 |
| | (10−7 g eq/g) | 9.2 | 9.2 | 9.2 | 9.2 | 9.2 | 9.2 | | | 9.2 | 9.2 | 9.2 | 9.2 | 9.2 |
| | C-3 alkenyl | | | | | | | | 5 | | | | | |
| | (10−7 g eq/g) | | | | | | | | 9.2 | | | | | |
| D) | D-1 E-GMA | | | | | | | 5 | | | | | | |
| | (10−5 g eq/g) | | | | | | | 7.0 | | | | | | |
| E) | E-1 Mg(OH)$_2$ | 100 | 100 | 100 | 100 | 100 | 100 | 100 | 100 | | 100 | 100 | 100 | 100 |
| | E-2 Al(OH)$_3$ | | | | | | | | | 100 | | | | |
| Red phosphorus | | 3 | 3 | 3 | 3 | 3 | 3 | 3 | 3 | 3 | 3 | 3 | 3 | 3 |
| Crosslinking Aid | | 5 | 5 | 5 | 5 | 5 | 5 | 5 | 5 | 5 | 5 | 5 | 5 | 5 |
| | MFR | 0.28 | 0.25 | 0.24 | 0.25 | 0.23 | 0.22 | 0.25 | 0.27 | 0.22 | 0.26 | 0.28 | 0.22 | 0.26 |
| | YTS | 132 | 120 | 128 | 129 | 132 | 124 | 127 | 128 | 126 | 124 | 126 | 128 | 130 |
| | UTS | 126 | 123 | 124 | 122 | 121 | 130 | 128 | 123 | 127 | 123 | 126 | 123 | 121 |
| | UEL | 400 | 410 | 410 | 410 | 410 | 440 | 420 | 440 | 440 | 470 | 450 | 450 | 410 |
| | OI | 29.8 | 30.3 | 30.2 | 29.2 | 29.7 | 29.9 | 29.8 | 30.0 | 29.8 | 29.8 | 29.9 | 30.2 | 29.5 |
| | Electron beam exposure Mrd | 15 | 15 | 15 | 15 | 15 | 15 | 15 | 15 | 15 | 15 | 15 | 15 | 15 |
| Abrasion Resistance mg | | 36 | 39 | 50 | 53 | 45 | 44 | 45 | 51 | 52 | 47 | 51 | 53 | 50 |
| Gelation % | | 80 | 81 | 88 | 83 | 82 | 88 | 83 | 81 | 83 | 86 | 86 | 81 | 86 |

TABLE 8-continued

| | Example Nos. 92–104 | | | | | | | | | | | | |
|---|---|---|---|---|---|---|---|---|---|---|---|---|---|
| | 92 | 93 | 94 | 95 | 96 | 97 | 98 | 99 | 100 | 101 | 102 | 103 | 104 |
| Heat Deformation % | 3.2 | 4.1 | 4.3 | 4.4 | 4.3 | 4.1 | 4.6 | 4.3 | 4.2 | 4.1 | 4.3 | 4.1 | 4.0 |

TABLE 9

| | | Comparative Example Nos. 1–11 | | | | | | | | | | |
|---|---|---|---|---|---|---|---|---|---|---|---|---|
| | | 1 | 2 | 3 | 4 | 5 | 6 | 7 | 8 | 9 | 10 | 11 |
| A) | A1 HDPE | | | | | | | 95 | 60 | 60 | | | |
| | A2 PP | | | | | | | | | | 95 | 60 | 60 |
| B) | B1-3 VLDPE | | | 100 | | | | | | | | | |
| | B2 EVA | | | | 100 | | | | | | | | |
| | B3 EEA | 100 | 100 | | | | | 5 | 40 | 40 | 5 | 40 | 40 |
| | B4 EPR | | | | | 100 | | | | | | | |
| C) | C-1 MAnLL | | 5 | 5 | 5 | 5 | 5 | 5 | 5 | 5 | 5 | 5 | 5 |
| | (10−7 g eq/g) | | 9.2 | 9.2 | 9.2 | 9.2 | 9.2 | 9.2 | 9.2 | 9.2 | 9.2 | 9.2 | 9.2 |
| E) | E-1 Mg(OH)$_2$ | 100 | 100 | 100 | 100 | 100 | 100 | 20 | 220 | 100 | 20 | 220 | |
| | MFR | 0.40 | 0.23 | 0.25 | 0.31 | 0.40 | 0.30 | 0.42 | 0.05 | 0.35 | 0.44 | 0.06 | |
| | YTS | 95 | 100 | 102 | 108 | 100 | 135 | 124 | 130 | 134 | 132 | 133 | |
| | UTS | 90 | 130 | 131 | 130 | 90 | 90 | 130 | 90 | 85 | 130 | 95 | |
| | UEL | 300 | 550 | 560 | 500 | 110 | 100 | 550 | 90 | 90 | 480 | 90 | |
| | OI | 26.0 | 26.1 | 26.5 | 25.5 | 24.5 | 24.9 | 19.8 | 29.8 | 24.7 | 19.9 | 30.5 | |
| Abrasion Resistance mg | | 200 | 190 | 195 | 190 | 180 | 40 | 45 | 50 | 39 | 43 | 48 |
| Heat Deformation % | | 15.2 | 14.0 | 13.8 | 12.5 | 15.0 | 4.5 | 4.9 | 8.0 | 4.3 | 4.7 | 7.8 |

TABLE 10

| | | Comparative Example Nos. 12–24 | | | | | | | | | | | | |
|---|---|---|---|---|---|---|---|---|---|---|---|---|---|---|
| | | 12 | 13 | 14 | 15 | 16 | 17 | 18 | 19 | 20 | 21 | 22 | 23 | 24 |
| A) | A1 HDPE | | | | | | | 95 | 60 | 60 | | | | |
| | A2 PP | | | | | | | | | | | | | |
| B) | B1-3 VLDPE | | | 100 | | | | | | | | 100 | | |
| | B2 EVA | | | | 100 | | | | | | | | 100 | |
| | B3 EEA | 100 | 100 | | | | 5 | 40 | 40 | 100 | 100 | | | |
| | B4 EPR | | | | | 100 | | | | | | | | 100 |
| C) | C-1 MAnLL | | 5 | 5 | 5 | 5 | 5 | 5 | 5 | | 5 | 5 | 5 | 5 |
| | (10−7 g eq/g) | | 9.2 | 9.2 | 9.2 | 9.2 | 9.2 | 9.2 | 9.2 | | 9.2 | 9.2 | 9.2 | 9.2 |
| E) | E-1 Mg(OH)$_2$ | 100 | 100 | 100 | 100 | 100 | 100 | 20 | 220 | 100 | 100 | 100 | 100 | 100 |
| Red phosphorus | | 3 | 3 | 3 | 3 | 3 | 3 | 3 | 3 | | | | | |
| Crosslinking Aid | | | | | | | | | | 5 | 5 | 5 | 5 | 5 |
| | MFR | 0.40 | 0.23 | 0.25 | 0.31 | 0.40 | 0.30 | 0.42 | 0.05 | 0.38 | 0.25 | 0.22 | 0.32 | 0.36 |
| | YTS | 95 | 100 | 102 | 108 | 100 | 135 | 124 | 130 | 92 | 110 | 100 | 102 | 110 |
| | UTS | 90 | 130 | 131 | 130 | 90 | 90 | 130 | 90 | 93 | 120 | 128 | 129 | 95 |
| | UEL | 300 | 550 | 560 | 500 | 110 | 100 | 550 | 90 | 280 | 520 | 540 | 510 | 100 |
| | OI | 29.6 | 30.3 | 29.9 | 30.5 | 30.1 | 24.6 | 19.1 | 38.7 | 26.3 | 26.1 | 26.0 | 26.1 | 26.2 |
| | Electron exposure Mrd | | | | | | | | | 15 | 15 | 15 | 15 | 15 |
| Abrasion Resistance mg | | 210 | 200 | 200 | 195 | 190 | 50 | 52 | 51 | 240 | 120 | 110 | 100 | 130 |
| Gelation % | | | | | | | | | | 30 | 85 | 88 | 84 | 83 |
| Heat Deformation % | | 15.5 | 14.7 | 14.1 | 12.4 | 16.0 | 4.4 | 5.1 | 8.4 | 13.5 | 11.4 | 10.1 | 10.2 | 10.3 |

TABLE 11

| | | Comparative Example Nos. 25–35 | | | | | | | | | | |
|---|---|---|---|---|---|---|---|---|---|---|---|---|
| | | 25 | 26 | 27 | 28 | 29 | 30 | 31 | 32 | 33 | 34 | 35 |
| A) | A1 HDPE | 95 | 60 | 60 | | | | | | 95 | 60 | 60 |
| | A2 PP | | | | | | | | | | | |
| B) | B1-3 VLDPE | | | | | | 100 | | | | | |
| | B2 EVA | | | | | | | 100 | | | | |
| | B3 EEA | 5 | 40 | 40 | 100 | 100 | | | | 5 | 40 | 40 |
| | B4 EPR | | | | | | | | 100 | | | |
| C) | C-1 MAnLL | 5 | 5 | 5 | 5 | 5 | 5 | 5 | 5 | 5 | 5 | 5 |
| | (10−7 g eq/g) | 9.2 | 9.2 | 9.2 | 9.2 | 9.2 | 9.2 | 9.2 | 9.2 | 9.2 | 9.2 | 9.2 |
| E) | E-1 Mg(OH)$_2$ | 100 | 20 | 220 | 100 | 100 | 100 | 100 | 100 | 100 | 20 | 220 |
| Red phosphorus | | | | | 3 | 3 | 3 | 3 | 3 | 3 | 3 | 3 |
| Crosslinking Aid | | 5 | 5 | 5 | 5 | 5 | 5 | 5 | 5 | 5 | 5 | 5 |
| | MFR | 0.30 | 0.40 | 0.04 | 0.37 | 0.27 | 0.21 | 0.34 | 0.33 | 0.30 | 0.38 | 0.04 |
| | YTS | 137 | 122 | 135 | 91 | 100 | 110 | 105 | 100 | 132 | 120 | 130 |
| | UTS | 90 | 128 | 91 | 90 | 110 | 122 | 123 | 90 | 94 | 120 | 90 |
| | UEL | 90 | 510 | 85 | 220 | 500 | 510 | 500 | 110 | 95 | 500 | 80 |
| | OI | 26.2 | 18.5 | 38.2 | 29.1 | 29.2 | 30.1 | 29.5 | 29.8 | 29.9 | 18.1 | 39.3 |
| | Electron exposure Mrd | 15 | 15 | 15 | 15 | 15 | 15 | 15 | 15 | 15 | 15 | 15 |
| Abrasion Resistance mg | | 53 | 50 | 50 | 220 | 110 | 130 | 120 | 127 | 51 | 52 | 53 |
| Gelation % | | 81 | 83 | 85 | 28 | 81 | 83 | 81 | 82 | 81 | 85 | 87 |

TABLE 11-continued

|  | Comparative Example Nos. 25–35 | | | | | | | | | | |
| --- | --- | --- | --- | --- | --- | --- | --- | --- | --- | --- | --- |
|  | 25 | 26 | 27 | 28 | 29 | 30 | 31 | 32 | 33 | 34 | 35 |
| Heat Deformation % | 4.2 | 5.3 | 10.3 | 13.8 | 12.4 | 11.1 | 10.7 | 10.0 | 4.4 | 5.0 | 10.1 |

TABLE 12

| | | Effects of Coupling Agent | | | | |
| --- | --- | --- | --- | --- | --- | --- |
| | | Ex. 105 | Ex. 106 | Ex. 107 | Ex. 108 | Com. 36 |
| A) | A1 HDPE | 60 | 60 | 60 | 60 | 60 |
| B) | B3 EEA | 40 | 40 | 40 | 40 | 40 |
| C) | C-1 MAnLL | 5 | | | | |
| | ($10^{-7}$ g eq/g) | 9.2 | | | | |
| | C-2 Alkenyl | | 5 | | | |
| | ($10^{-7}$ g eq/g) | | 9.2 | | | |
| | C-3 VTMS | | | | 5 | |
| | ($10^{-7}$ g eq/g) | | | | 9.2 | |
| D) | D-1 E-GMA | | | 5 | | |
| | ($10^{-5}$ g eq/g) | | | 7.0 | | |
| E) | E-1 Mg(OH)$_2$ | 100 | 100 | 100 | 100 | 100 |
| Abrasion Resistance mg | | 60 | 70 | 75 | 95 | 200 |

TABLE 13

| | | Influence of Composition | | | | | | | |
| --- | --- | --- | --- | --- | --- | --- | --- | --- | --- |
| | | Com. 37 | Com. 38 | Com. 6 | Ex. 1 | Ex. 2 | Ex. 3 | Com. 39 | Com. 9 |
| A) | A1 HDPE | 100 | 100 | 95 | 80 | 70 | 60 | | |
| | A2 PP | | | | | | | 100 | 95 |
| B) | B1-3 VLDPE | | | | | | | | |
| | B3 EEA | | | 5 | 20 | 30 | 40 | | 5 |
| C) | C-1 MAnLL | | 5 | 5 | 5 | 5 | 5 | 5 | 5 |
| | ($10^{-7}$ g eq/g) | | 9.2 | 9.2 | 9.2 | 9.2 | 9.2 | 9.2 | 9.2 |
| E) | E-1 Mg(OH)$_2$ | 100 | 100 | 100 | 100 | 100 | 100 | 100 | 100 |
| | MFR | 0.36 | 0.32 | 0.30 | 0.20 | 0.25 | 0.27 | 0.35 | 0.35 |
| | YTS | 118 | 128 | 135 | 130 | 128 | 125 | 130 | 134 |
| | UTS | 80 | 80 | 90 | 120 | 124 | 125 | 80 | 85 |
| | UEL | 85 | 90 | 100 | 500 | 460 | 400 | 95 | 90 |
| Abrasion Resistance mg | | 88 | 39 | 40 | 40 | 53 | 60 | 88 | 39 |

| | | Ex. 14 | Ex. 15 | Ex. 16 | Com. 2 | Com. 40 | Com. 41 | Com. 42 | Ex. 109 | Com. 43 |
| --- | --- | --- | --- | --- | --- | --- | --- | --- | --- | --- |
| A) | A1 HDPE | | | | | | | | | |
| | A2 PP | 80 | 70 | 60 | | 30 | 20 | 10 | 60 | 40 |
| B) | B1-3 VLDPE | | | | | | | | 40 | 60 |
| | B3 EEA | 20 | 30 | 40 | 100 | 70 | 80 | 90 | | |
| C) | C-1 MAnLL | 5 | 5 | 5 | 5 | 5 | 5 | | 5 | 5 |
| | ($10^{-7}$ g eq/g) | 9.2 | 9.2 | 9.2 | 9.2 | 9.2 | 9.2 | | 9.2 | 9.2 |
| E) | E-1 Mg(OH)$_2$ | 100 | 100 | 100 | 100 | 100 | 100 | 100 | 100 | 100 |
| | MFR | 0.21 | 0.25 | 0.27 | 0.23 | 0.28 | 0.30 | 0.35 | 0.22 | 0.24 |
| | YTS | 137 | 135 | 130 | 100 | 105 | 112 | 98 | 130 | 126 |
| | UTS | 120 | 123 | 125 | 130 | 110 | 118 | 95 | 124 | 118 |
| | UEL | 400 | 420 | 440 | 550 | 490 | 510 | 350 | 440 | 480 |
| Abrasion Resistance mg | | 38 | 50 | 57 | 190 | 130 | 150 | 190 | 55 | 120 |

What is claimed is:

1. An abrasion-resistant flame-retardant composition comprising:
   (i) 100 parts by weight of a polymer component containing:
   (A) 50–90% by weight, based on the total polymer weight, of a polyolefinic resin having a maximum peak temperature (Tm) of higher than 125° C. as measured by differential scanning calorimetry (DSC); and
   (B) 10–50% by weight, based on the total polymer weight, of a polyethylenic resin or rubber having a maximum peak temperature Crm) of lower than 125° C. as measured by DSC; and
   (II) 30–200 parts by weight of an inorganic flame retardant
   said polymer component (I) containing $10^{-8}$–$10^{-5}$ gram equivalent based on 1 g of the polymers, of at least one functional group; incorporated on the polymer by graft modification, and wherein
   said component (A) is at least one member selected from HDPE and PP: said component (B) is at least one member selected from VLDPE, LLDPE, LDPE, EVA having a vinyl acetate content of 5–30% by weight and EEA having an ethyl acrylate content of 5–30% by weight; a functional group-containing polymer is an ethylene/α-olefin copolymer modified with maleic anhydride and having a density of 0.86 to less than 0.97 g/cm$^3$; and said inorganic flame retardant (II) is at least one member selected from magnesium hydroxide and aluminum hydroxide.

2. The composition of claim 1, further containing red phosphorus.

3. The composition of claim 1, further containing a crosslinking aid.

4. The composition of claim 1, further containing red phosphorus and a crosslinking aid.

5. The composition of claim 1, wherein said component A) is HDPE; said component B) is EEA having an ethyl acrylate content of 5–30% by weight; said component C) is an ethylene/α-olefin copolymer modified with maleic anhydride and having a density of 0.86 to less than 0.97 g/cm$^3$; and said inorganic flame retardant as component (II) is magnesium hydroxide.

6. The composition of claim 1, wherein said component A) is PP; said component B) is EEA having an ethyl acrylate content of 5–30% by weight; said functional group-containing polymer is an ethylene/α-olefin copolymer modified with maleic anhydride and having a density of 0.86 to 0.97 g/cm$^3$; and said inorganic flame retardant is magnesium hydroxide.

7. The composition of claim 1, which exhibits a reduction in weight of not more than 100 mg after testing at a load of kg and 1,000 revolutions using a Taber abrader, truck wheel H-22.

8. A coating or insulating material comprising the abrasion-resistant flame-retarding composition of claim 1.

9. The coating or insulating material of claim 7, for insulating or coating electric wires and cables, for coating electric wire or cable protecting pipes or joint covers, or for insulating or coating electric components and devices such as cabinets, boxes and sheets.

10. The insulating material of claim 8, for insulating electric wires and cables in automobiles, vehicles, aircraft, ships and industrial robots.

11. The composition of claim 1, possessing improved abrasion and heat resistance while retaining mechanical strength, flexibility, processability and flame retardancy.

12. The composition of claim 1, possessing improved flexibility, impact resistance and acceptability of said inorganic flame retardant without deteriorating mechanical strength.

13. The composition of claim 1, possessing improved mechanical strength, abrasion resistance, heat resistance, processability and further possessing improved antidripping property by formation of char during combustion.

14. The composition of claim 1 which possesses high flame retardancy, does not evolve a poisonous gas during combustion, possesses superior abrasion and heat resistance and is also superior in safety, flexibility, mechanical characteristics, resistance to chemicals and electrical characteristics.

* * * * *